United States Patent [19]

Chen et al.

[11] Patent Number: 5,006,141
[45] Date of Patent: Apr. 9, 1991

[54] THERMALLY EFFICIENT MELTING FOR GLASS MAKING

[75] Inventors: Michael S. K. Chen, Zionsville; Corning F. Painter; Steven P. Pastore, both of Allentown; Gary Roth, Trexlertown; David C. Winchester, Allentown, all of Pa.

[73] Assignee: Air Products and Chemicals, Inc., Allentown, Pa.

[21] Appl. No.: 474,200

[22] Filed: Jan. 30, 1990

[51] Int. Cl.$^5$ .................................................. C03B 5/04
[52] U.S. Cl. ............................................ 65/27; 65/134; 65/135
[58] Field of Search ........................... 65/27, 134, 135

[56] References Cited

U.S. PATENT DOCUMENTS

| | | | |
|---|---|---|---|
| 3,337,324 | 8/1967 | Cable et al. | 65/135 |
| 3,592,622 | 7/1971 | Shepherd | 65/135 |
| 3,592,623 | 7/1971 | Shepherd | 65/135 |
| 3,627,504 | 12/1971 | Johnson et al. | 65/135 |
| 3,856,496 | 12/1974 | Nesbitt et al. | 65/29 |
| 3,880,639 | 4/1975 | Bodner et al. | 65/134 |
| 4,350,512 | 9/1982 | Krumwiede | 65/27 |
| 4,441,906 | 4/1984 | Propster et al. | 65/27 |
| 4,473,388 | 9/1984 | Lauwers | 65/134 |
| 4,528,012 | 7/1985 | Sturgill | 65/135 |
| 4,531,960 | 7/1985 | Desprez | 65/134 |
| 4,539,035 | 9/1985 | Burckhardt et al. | 65/136 |
| 4,599,100 | 7/1986 | Demerest | 65/134 |
| 4,617,046 | 10/1986 | Hals | 65/134 |
| 4,622,007 | 11/1986 | Gitman | 432/13 |
| 4,642,047 | 2/1987 | Gitman | 432/13 |
| 4,696,690 | 9/1987 | Roloff | 65/27 |
| 4,761,132 | 8/1988 | Khinkis | 431/10 |

FOREIGN PATENT DOCUMENTS 2140910 12/1984 United Kingdom .

OTHER PUBLICATIONS

H. R. Miller & K. Royds, The Use of Oxygen in Glass Making, vol. 14, No. 6, 12/73, pp. 171-181.
Dr. Fay V. Tooley, The Handbook of Glass Manufacture, vol. 1, pp. 389-395, Date unknown, 3rd Ed.

*Primary Examiner*—Robert L. Lindsay
*Attorney, Agent, or Firm*—Geoffrey L. Chase; James C. Simmons; William F. Marsh

[57] ABSTRACT

The present invention is an integrated process for the production of glass utilizing combustion heat to melt glassmaking materials in a glassmaking furnace. The fuel combusted to produce heat sufficient to melt the glassmaking materials is combusted with oxygen-enriched oxidant to reduce heat losses from the offgas of the glassmaking furnace. The process further reduces heat losses by quenching hot offgas from the glassmaking furnace with a process stream to retain the heat recovered from quench in the glassmaking process with subsequent additional heat recovery by heat exchange of the fuel to the glassmaking furnace, as well as the glassmaking materials, such as batch and cullet. The process includes recovery of a commercially pure carbon dioxide product by separatory means from the cooled, residual offgas from the glassmaking furnace.

12 Claims, 3 Drawing Sheets

THERMALLY EFFICIENT MELTING FOR GLASS MAKING

TECHNICAL FIELD

The present invention is directed to improved processing for oxygen enriched glassmaking furnaces with integrated processing of heat and process streams. More particularly, the present invention is directed to the use of commercially pure oxygen in a glassmaking furnace with recovery of heat from the offgas, which offgas is predominately carbon dioxide due to the oxygen purity and which carbon dioxide is recovered for recycle and for export as product.

BACKGROUND OF THE PRIOR ART

The glass manufacturing industry has made numerous attempts to enhance the efficiency of glassmaking furnaces which by and large utilize very traditional combustion technology.

For instance, a number of patents have contemplated utilization of oxygen enriched combustion gas in a glassmaking furnace, such as U.S. Pat. No. 3,337,324 which discloses the use of oxygen enriched air to raise combustion temperature and heat transfer rate to melt batch in a glassmaking furnace. U.S. Pat. 3,592,622 and 3,592,623 suggest the use of oxy-fuel burners to accelerate batch melting in a furnace. U.S. Pat. No. 3,627,504 discloses a submerged burner to promote homogeneous mixing of glass coloring added to batch. U.S. Pat. No. 3,856,496 discloses the use of two pairs of oxygen enriched air burners mounted in the wall of a glassmaking furnace for melting raw batched materials within the furnace. U.S. Pat. No. 4,473,388 suggests low momentum oxy-fuel flames aimed at the batch/glass interface which covers the entire width of the furnace to improve melting and fining. U S. Pat. No. 4,531,960 teaches heating the batch in a glassmaking furnace by a combination of one air-fuel flame and one oxygen-fuel flame. U.S. Pat. No. 4,539,035 discloses an oxygen burner positioned on the top of a furnace wall for injecting a flame downward, with a shower of cullet surrounding the flame, for heating the cullet and for protecting the furnace wall. U.S. Pat. No. 4,622,007 and 4,642,047 disclose liquid cooled oxy-fuel burner designs for two-stage combustion for melting materials, such as glass. U.S. Pat. No. 4,761,132 suggests oxygen-rich gas burners for two-stage combustion for $NO_x$ control for the glass industry. British patent 2,140,910 discloses an oxy-fuel burner design for glass melting tanks which do not decrease the flame length. An article entitled "The Use of Oxygen in Glass Making Furnaces", H. R. Miller and K. Royds appearing in *Glass Technology*, volume 14, no. 6, December 1973, pages 171-181, discusses oxy-fuel trials conducted in a glassmaking furnace.

The co-generation of electricity from the waste heat recovered from a glassmaking furnace has been the subject of various disclosures, including U.S. Pat. No. 4,528,012 which suggests methods of recovery of useful energy by transferring heat from hot waste gas leaving a glassmaking furnace regenerator to a compressed air stream and then expanding the hot air for power generation. The expanded air at reduced pressure is then used for combustion in the glassmaking furnace.

The glass making industry has also sought various ways of heating cullet and batch with the waste heat from glassmaking furnace, exemplified by U.S. Pat. No. 3,880,639 which discloses a method for pollution abatement in a glass melting process by passing hot waste gas countercurrently for direct heat exchange with agglomerated alkaline glass batch. Sulphur compounds in the waste gas are removed by reacting with the alkaline glass batch. U.S. Pat. No. 4,350,512 suggests that cullet may be used to recover heat and particulate from hot waste gas. Electrostatic means may be used to enhance the particulate collection. U.S. Pat. No. 4,441,906 suggests a method for preheating glass batch with heating media which is heated in turn by furnace exhaust gas and using the heated media to preheat the glass batch. A technique to clean media of gas condensate is also included. U.S. Pat. 4,696,690 suggests a method using hot waste gas to preheat raw materials, particularly cullet, in a bunker bed up to about 716° F. and the cooled waste gas is then sent to a wet scrubber to remove $SO_x$, $NO_x$ and particulates.

The prior art has also contemplated the recovery of carbon dioxide from the glassmaking process as described in page 394 of the book, the Handbook of Glass Manufacture, Vol. 1, Third Edition, Editor, Dr. Faye V. Tooley, Ashlee Publishing Company, 1984, in which carbon dioxide is recovered from an all-electric glass melter as a component of offgas from the glass melt itself.

Although the prior art has suggested various individual techniques for incrementally enhancing efficiency of the glass melting process, the glass melting operation remains a significant energy consuming process with minimal heat recovery and sizable effluent treatment concerns. The present invention offers an integrated and unique process for overcoming these efficiency and pollution problems as will be set forth more particularly below.

BRIEF SUMMARY OF THE INVENTION

The present invention is an integrated process for the production of glass utilizing combustion heat to melt glassmaking materials in the glass making furnace, comprising: heating glass making materials of batch and cullet feedstocks in a glassmaking furnace by the combustion of fuel with an oxygen-enriched oxidant stream, removing a hot offgas from said glassmaking furnace comprising a substantially carbon dioxide-containing combustion product and feedstock volatiles and quenching the offgas using a relatively cooler process stream to condense out the volatiles, further cooling at least a portion of the offgas against the fuel fed to the glassmaking furnace and against at least a portion of the glassmaking materials to the furnace, separating carbon dioxide in substantially pure form from the offgas as a product of the process and recovering a refined glass as a product of process.

Preferably, a portion of the offgas, after cooling against the batch and/or cullet feedstocks and before carbon dioxide separation, is recycled and mixed with the hot offgas from the glassmaking furnace to quench and cool the hot offgas.

Preferably, the offgas is separated into a carbon dioxide product, a vent stream and water. Alternatively, a portion of the water derived from the offgas is used to quench the hot offgas from the glassmaking furnace.

Preferably, a portion of the offgas is heat exchanged with the cullet to cool the offgas and heat the cullet.

Preferably, the offgas is heat exchanged with the batch to cool the offgas and heat the batch.

Preferably, the carbon dioxide separation is a cryogenic distillation. Alternatively, the carbon dioxide separation is an adsorptive separation. Further alternatively, the carbon dioxide separation is a membrane separation.

Preferably, the oxygen-enriched gas is commercially pure oxygen. More preferably, the oxygen-enriched gas is at least 93% oxygen.

More particularly, the process of the present invention in an integrated process for the production of glass utilizing combustion heat to melt glassmaking materials in a glassmaking furnace, comprising: heating glassmaking materials of batch and cullet feedstocks in a glassmaking furnace by the combustion of fuel with an oxygen-enriched oxidant stream, removing a hot offgas from the glassmaking furnace, comprising a substantially carbon dioxide-containing combustion product and feedstock volatiles and cooling the offgas by indirect heat exchange with an elevated pressure gas stream, which gas stream is heated in the heat exchange, expanded through a turbine to recover energy, cooled against an external cooling fluid and then recompressed to be used as the elevated pressure gas stream, further cooling at least a portion of the offgas against the fuel fed to the glassmaking furnace and at least a portion of the glassmaking materials to the furnace, separating carbon dioxide in substantially pure form from the off-gases as a product of the process and recovering a refined glass as a product of the process.

Preferably, the elevated pressure gas stream is air. More preferably, a portion of the elevated pressure air is used as feed to an air separation process to produce oxygen-enriched gas for the glassmaking furnace.

DETAILED DESCRIPTION OF THE INVENTION

The present invention discloses a thermally efficient alternative glass melting process for glassmaking furnaces. The present invention utilizes high purity oxygen of 93% oxygen or better for combustion in a glassmaking furnace which not only increases the heat transfer rate for batch melting the furnace, but also significantly reduces the waste gas sensible heat loss to the stack by virtue of flow reduction by the elimination of nitrogen which would exist if air rather than oxygen were utilized as the oxidant gas to the glassmaking furnace. Furthermore, use of high purity oxygen in the process permits by-product carbon dioxide recovery at high purity. Alternatively, useful mechanical or electrical energy can be recovered for use, for instance, in air separation, electric boosting in the glassmaking furnace or simply for export to other processes.

Figure 1:
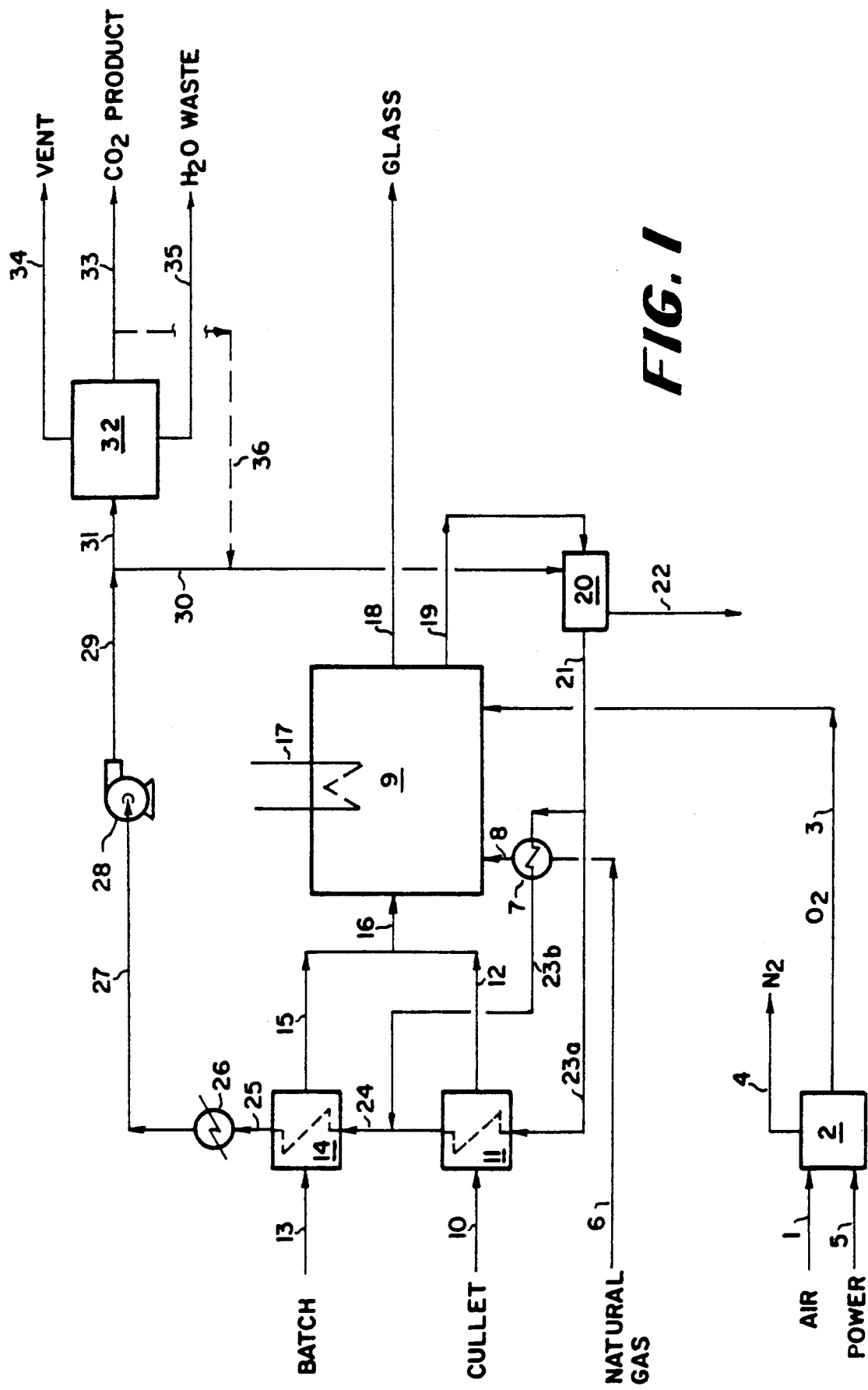
FIG. 1 is a first embodiment of the present invention illustrated in a schematic flow scheme with an offgas recycle.

FIG. 1 shows a first preferred embodiment of the present invention for producing for example 250 tons per day of glass. Air in line 1 is separated in air separation unit 2 either by cryogenics, membrane or an adsorptive PSA or VSA system to produce a high purity oxygen stream 3 at approximately 48,200 standard cubic feet per hour flow of 93% oxygen, 4% argon and 3% nitrogen. Also, a waste nitrogen stream is produced in line 4. A power input illustrated as line 5 of about 610 kilowatts is supplied for the air separation. The oxygen in line 3 is either directly fed to the furnace 9 or can be further indirectly heated by the hot waste gas from the glassmaking furnace, although this is not illustrated. Natural gas in line 6 or other appropriate fuel of 25,000 standard cubic feet per hour (25 MMBTU/hr HHV) is heated to about 1,000° F. through a heat exchanger 7 by the hot waste offgas from the glassmaking furnace in line 23b. The heated natural gas stream in line 8 is fed to the furnace 9 for combustion. Approximately 7,110 pounds per hour of cullet feed 10 (recycled glass) is heated in a cullet preheater 11 to about 1200° F. by the hot waste offgas in line 23a, and 16,600 pounds per hour of batch feed 13 (sand, i.e., $SiO_2$, and one or more of alumina, $Na_2O$, $K_2O$, lime, feldspar, sodium or calcium carbonate, and fining chemicals) is also heated by hot waste offgas 24 to about 490° F. in the batch preheater 14. Both the preheated cullet in line 12 and the preheated batch 15 are mixed together, and the mixture in line 16 is fed to the glassmaking furnace 9.

In the glassmaking furnace 9, the intensive heat is released by natural gas combustion with oxygen to melt the mixture of glassmaking materials to the molten glass state. The furnace is provided with electric boosting 17 with about 1,000 kilowatts of power input at 90% thermal efficiency. Approximately 250 tons pers day of hot glass 18 at about 2,430° F. leaves the melting zone of furnace 9 and flows to the fining zone not shown. Hot waste offgas in line 19 exits the glassmaking furnace 9 at 110,000 standard cubic feet per hour at about 2,190° F. and is quenched to about 1300° F. in a direct heat exchange quench column 20 by mixing with 100,000 standard cubic feet per hour of recycled cool offgas in line 30. In the hot gas quench column 20, hot condensibles such as sodium sulfate, borates, fluorides and others (feedstock volatiles) as well as batch particulates, are recovered and discharged in line 22. A portion of this hot condensibles can be cooled, solidified and recycled to the batch materials as a fining agent, although this is not illustrated. The remaining portion can be treated as waste and disposed. The offgas in line 21 is split into stream 23a and 23b which latter stream passes through heat exchanger 7 to indirectly heat the natural gas in line 6 before the natural gas in line 8 enters the glassmaking furnace 9. After being cooled by heating the cullet in cullet preheater (heat exchanger) 11, the offgas in line 23a is mixed with the offgas in line 23b to result in the offgas in line 24, which is further cooled by heating batch in the batch preheater (heat exchanger) 14. The offgas in line 25 containing about 50% carbon dioxide and 50% water vapor with minor amounts of nitrogen and argon and traces of $NO_x$ and $SO_x$ and particulates is further cooled in a cooler 26 to about 200° F. by external cooling fluids, such as water, resulting in stream 27 which is fed to a recycle blower 28. A portion of the now cool offgas in line 29 is recycled to the hot gas quench column 20 by line 30. The remaining portion of the offgas in line 31 is sent to a carbon dioxide recovery system 32, from which about 54,000 standard cubic feet per hour of high purity carbon dioxide is produced as a product 33 with a minor vent gas 34 and water condensate 35. A portion of the carbon dioxide stream in line 36 can be used as quench gas to replace the recycled gas 30 as illustrated in the dotted line configuration.

The overall thermal energy efficiency of this process is about 53%. The energy consumption is reduced by 23% as compared to an air-based process.

Figure 2:
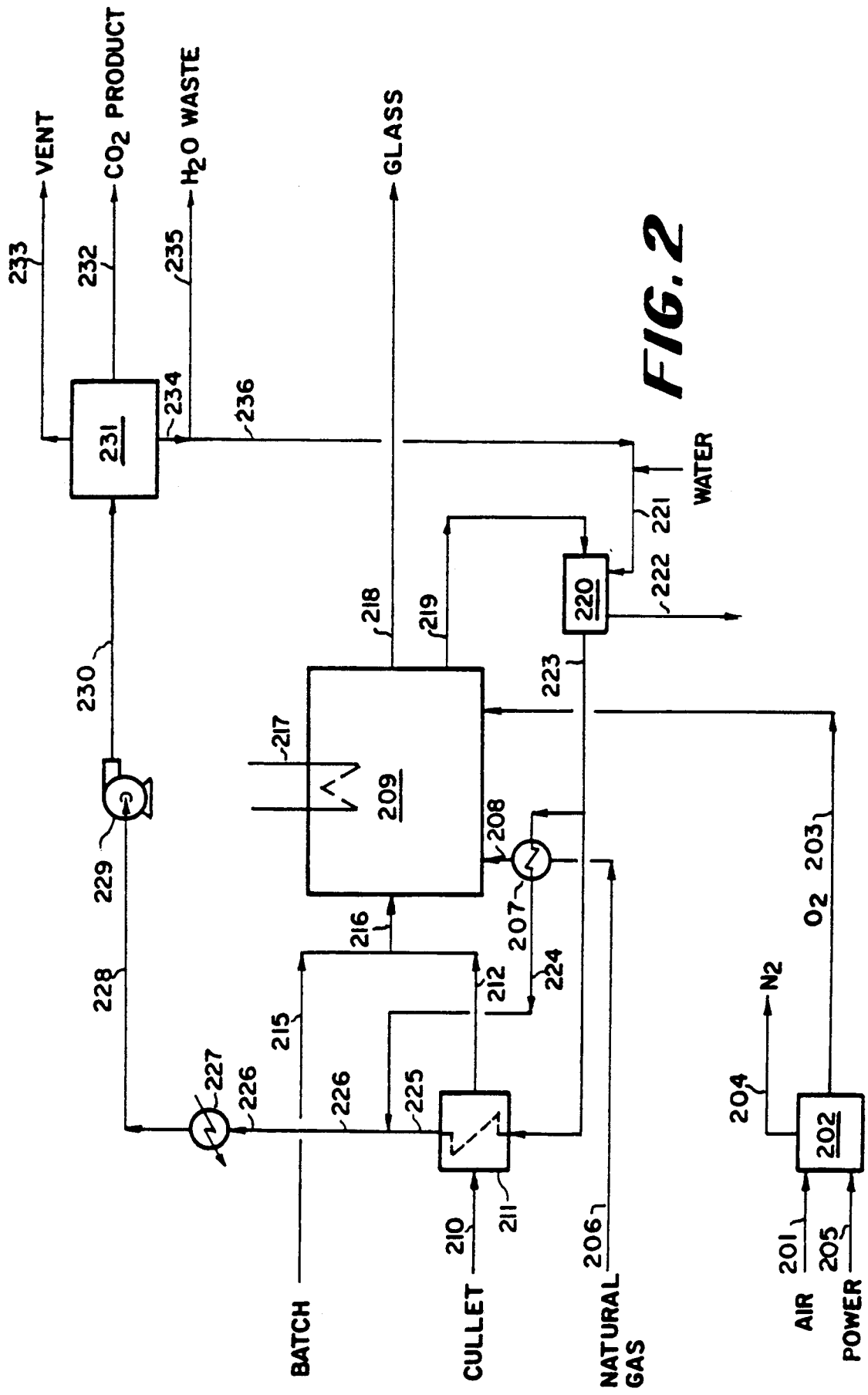
FIG. 2 is a second embodiment of the present invention illustrated in a schematic flow scheme with a water recycle.

FIG. 2 discloses a second preferred embodiment of the present invention wherein water and/or steam can be used to quench the hot offgas of the glassmaking furnace in contrast to recycled cooled offgas or carbon dioxide byproduct. Air in line 201 is separated into commercially pure oxygen 203 and waste nitrogen 204 in an air separation unit 202 with the consumption of power in line 205. The waste nitrogen is removed in line 204 while the oxygen in line 203 is introduced into the glassmaking furnace 209. Natural gas in line 206 is introduced into the glassmaking furnace 209 through heat exchanger 207 which preheats the fuel for introduction through line 208. Glass is removed in line 218 after being melted in the glassmaking furnace 209 with the assistance of an electric boost in line 217. An offgas from the combustion of fuel and oxygen, being substantially carbon dioxide-containing, is removed in line 219 and is quenched in a quench column 220 by water, steam or recycled water 221. Hot condensates are removed in line 222. The quenched offgas in line 223 is split into a side stream 224, which as explained above preheats the fuel in heat exchanger 207, and a remaining stream. The remaining hot offgas is further cooled in cullet preheater (heat exchanger) 211 against incoming cullet feed in line 210 and exits the heat exchanger in line 225 to be recombined with the portion of the offgas in line 224 to result in stream 226. The heated cullet in line 212 is combined with batch in line 215 and the combination in line 216 is introduced into the glassmaking furnace 209 as fresh feed. The recombined offgas is cooled in heat exchanger 227 against an external cooling fluid, such as cooling water, and passes in line 228 through a recycle blower 229. The offgas is then delivered in line 230 to a carbon dioxide recovery zone 231. Using cryogenic, membrane or adsorptive separation, carbon dioxide is extracted in line 232 as a product of the process, as well as water in line 234 and a minor amount of vent gas in line 233. Net water is removed in line 235, but a portion of the water can be recycled in line 236 to be used as the quench or a portion of the quench in the hot offgas quench column 220.

As shown, this embodiment quenches the hot waste offgas 19 which is at about 2,200° F. in the quench column 220, by spraying 2,970 pounds per hour of water in line 221 into the offgas in the quench column, which results in a temperature reduction to about 1300° F.

Alternatively, it is possible to use the waste nitrogen from the air separation plant in line 204 for quench duty, but this would drastically
the carbon dioxide content of the cooled offgas in line 230 and reduce the availability of separatory schemes for the recovery of carbon dioxide, as well as reducing the available byproduct of saleable carbon dioxide that is recoverable from a nitrogen carbon dioxide separation.

Further alternatively, it is also possible to use a portion of the feed material such as batch, lime or cullet as the quench media, such as in a fluidized bed, trickle bed or moving bed for direct heat exchange contacting.

Figure 3:
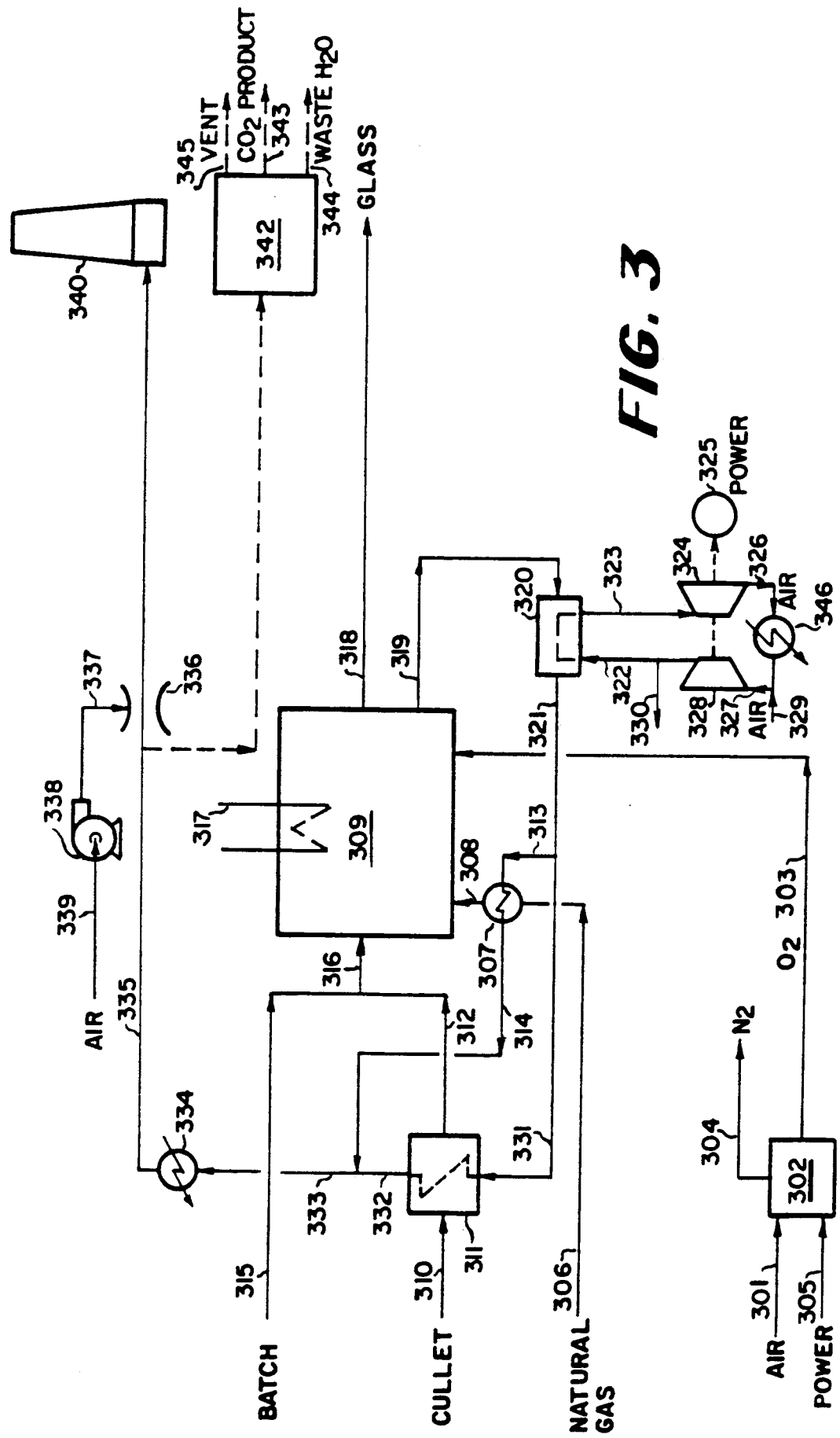
FIG. 3 is a third embodiment of the present invention illustrated in a schematic flow scheme with power recovery from waste heat.

With reference to FIG. 3, a third preferred embodiment to the present invention is set forth, wherein air in line 301 is fed to an air separation unit 302, which consumes power illustrated in line 305, to produce 62,000 standard cubic feet per hour of high purity oxygen in line 303 and a waste nitrogen stream in line 304. The power consumption is 780 kilowatts of power. Natural gas in line 306 is fed at 30,400 standard cubic feet per hour into an indirect heat exchanger 307 to be preheated to 1,000° F. against a portion of the offgas in line 313 before the natural gas is fired into the glassmaking furnace 9 in line 308 and combusted with the oxygen-enriched gas introduced in line 303. Approximately 7,100 pounds per hour of cullet feed in line 310 is heated by the hot waste offgases in the cullet preheater (heat exchanger) 311 to 860° F. and mixed with 16,600 pounds per hour of batch feed in line 315. The resulting mixture in line 316 is then fed to the glassmaking furnace 309. The glassmaking furnace is electrically boosted with 1,000 kilowatts of power input illustrated in line 317. The glass materials are melted to about 2,430° F. by the combustion gas introduced at a temperature of 2,670° F. The glass production in the glassmaking furnace 309 is approximately 250 tons per day removed in line 318. Approximately 137,400 standard cubic feet per hour of hot waste offgas is removed in line 319 at a temperature of 2,220° F. This hot waste offgas is cooled in a recuperator 320, constructed of a shell and tube-type indirect heat exchanger, with the resulting temperature of the offgas in line 321 being 1,100° F.

The cooling is achieved by passing a compressed gas, such as air, in line 322 through the recuperator heat exchanger 320. The metal surface temperature must be maintained below about 1,400° F. to prevent metal failure. Any hot condensibles, such as sodium sulfate, can be drained off from the recuperator, although this is not shown. The heated hot air in line 323 is then expanded through an expander 324 to generate power, a portion of which can be consumed by the compressor 328 for the gas used for the exchange. Net power produced in 325 can be shaft power or electric power produced by an appropriately driven generator. This amounts to 300 kilowatts. This net power can be used for electric boosting in the glassmaking furnace or it can be used in the air separation unit 302. Additionally, such net power can be used in the carbon dioxide recovery system or simply to provide for export. The expanded air in line 326 is cooled in indirect heat exchanger 346 against an external cooling fluid, such as cooling water, and then is combined with any necessary feed gas, such as air, in line 329 to result in stream 327 which is compressed in compressor 328 to elevated pressure. A portion of the elevated pressure gas, if it is air, can be removed in line 330 and introduced as a portion of the air in line 301 with the feed air to air separation unit 302. This cyclic closed circuit system provides cooling duty to cool the glassmaking furnace offgas 319 by indirect heat exchanger recuperator 320, while providing, potentially, air and net power.

The cooled offgas in line 321 is split into a residual offgas in line 331 and a bypass offgas stream in line 313. This bypass stream is cooled in indirect heat exchanger 307 to about 400° F. by heating the fuel or natural gas which in its heated condition is introduced in line 308 into the glassmaking furnace 309. The cooled bypass offgas in line 314 is recombined with the other offgas emanating from the cullet preheater (heat exchanger) 311 in line 332. The cullet in 310 is removed in line 312 and combined with batch in line 315, to result in a combined feed in line 316 to the glassmaking furnace 309. The recombined offgas streams in line 332 and 314, resulting in combined stream 333, are cooled against an external cooling fluid, such as water, in indirect heat exchanger 334. The pressure of the recombined offgas, now in line 335, can be increased by passage through an eductor 336 which is fed with air in line 339 passed through blower 338 and line 337. The offgas is then vented in stack 340.

Alternatively, the offgas in line 335 can be processed in carbon dioxide removal unit 342 to produce a vent 345 carbon dioxide product 343 and wastewater in 344.

This third embodiment of the present invention has an overall thermal efficiency of about 50%. The thermal energy consumption is reduced by 18% over an air based process.

The processes of the present invention use high purity oxygen (above 30% oxygen) and preferably above 80% oxygen for combustion with fuel in a glassmaking furnace to achieve high heat fluxes to the glass and to reduce the waste gas flow rate substantially. Thus reducing the heat losses and reducing equipment sizes and thus making waste heat recovery easier and more economical. Furthermore, high purity carbon dioxide can be recovered as a valuable by-product. Because nitrogen is substantially reduced $NO_x$ production is minimal and expensive de-$NO_x$ devices are not required. Reduced hot gas flow through the system results in reduced particulate carryover. Expensive solids remover system such as electrostatic precipitators or baghouses are thus eliminated. Use of direct hot gas quench in the process is all that is needed for capturing the condensibles such as sodium sulfate. Overall thermal energy reduction of over 20% compared to air based operations are achieved through the highly integrated heat recovery scheme and power recovery schemes.

The present invention is distinguished from the prior art by the use of the hot gas quench with cooled recycle gas, water and/or steam injection, carbon dioxide recycle or solid media (sand, cullet, lime, batch) to a lower minimal temperature of about 1300° F. for ease of heat recovery in conventional heat recovery schemes. Furthermore, hot condensibles, such as sodium sulfate, are removed and preferably recycled to the glassmaking furnace without using expensive pollution abatement equipment. Aside from reduction of primary $NO_x$ due to high purity oxygen used in the glassmaking furnace, the secondary $NO_x$ formation is also reduced because of rapid quench cooling of the hot waste gas.

The prior art does not suggest such integrated process schemes particularly with high purity oxygen enrichment. With the reduction of nitrogen in the offgas and the predominance of carbon dioxide, the present invention is also distinguished in recovery of carbon dioxide from the cooled offgas stream. The only previous related suggestion was for carbon dioxide removal in an all electric melting process where carbon dioxide is solely generated from decomposition of the carbonates from the batch materials. Carbon dioxide recovery would not be attractive from air based fuel fired glassmaking furnace processes because of the nitrogen diluent.

A further distinguishment of one of the embodiments of the present invention over the prior art, is the use of a gas turbine power cycle to convert waste heat to useful mechanical or electrical energy. The concept of the present invention differs from the prior art in that compressed hot air is not used in the glassmaking furnace, but rather is used as a heat carrier in a Brayton Gas Turbine Cycle or partially as air feed to an air separation unit to provide the oxygen enrichment for the combustion of the glassmaking furnace. By using a Brayton Gas Turbine Cycle, it is possible to remove the hot condensibles of the offgas from the glassmaking furnace without added gas volume or contaminants to the otherwise predominant carbon dioxide stream. This reduces the size of heat recovery equipment because of the absence of added gas volume. The resulting power, particularly in electrical form, can be used for boosting the glassmaking furnace of air separation duty, making the process closer to self-sufficient.

The present invention has been set forth with reference to several preferred embodiments, however the full scope of the invention should be ascertained from the claims which follow.

We claim:

1. An integrated process for the production of glass utilizing combustion heat to melt glass making materials in a glassmaking furnace, comprising:
   (a) heating glass making materials of batch and cullet feedstocks in a glassmaking furnace by the combustion of fuel with an oxygen-enriched oxidant stream.,
   (b) removing an hot offgas from said glassmaking furnace comprising a substantially carbon dioxide-containing combustion product and feedstock volatiles and quenching the offgas using a relatively cooler process stream to condense out said volatiles;
   (c) further cooling at least a portion of the offgas against the fuel fed to the glassmaking furnace and at least a portion of the glassmaking materials to the furnace;
   (d) separating carbon dioxide in substantially pure form from the offgas as a product of the process by a separation selected from the group consisting of cryogenic distillation, adsorptive separation, membrane separation or combinations thereof; and
   (e) recovering a refined glass as a product of the process.

2. The process of claim 1 wherein a portion of the offgas after cooling against the batch and/or cullet feedstocks, but before carbon dioxide separation is recycled and mixed with the hot offgas from the glassmaking furnace to quench and cool the hot offgas.

3. The process of claim 1 wherein the offgas of step (c) is separated into a carbon dioxide product, a vent stream and water.

4. The process of claim 3 wherein at least a portion of the water is used to quench the hot offgas.

5. The process of claim 1 wherein a portion of the offgas is heat exchanged with the cullet to cool the offgas and heat the cullet.

6. The process of claim 1 wherein the offgas is heat exchanged with the batch to cool the offgas and heat the batch.

7. An integrated process for the production of glass utilizing combustion heat to melt glassmaking materials in a glassmaking furnace, comprising:
   (a) heating glass making materials of batch and cullet feedstocks in a glassmaking furnace by the combustion of fuel with an oxygen-enriched oxidant stream;
   (b) removing an hot offgas from said glassmaking furnace comprising a substantially carbon dioxide-containing combustion product and feedstock volatiles and cooling the offgas by indirectly heat exchange with an elevated pressure gas stream, which is heated in the heat exchange, expanded through a turbine to recover energy, cooled against an external cooling fluid and then recompressed to be used as the elevated pressure gas stream;

(c) further cooling at least a portion of the offgas against the fuel fed to the glassmaking furnace and at least a portion of the glassmaking materials to the furnace;

(d) separating carbon dioxide in substantially pure form from the offgas a a product of the process by a separation selected from the group consisting of cryogenic distillation, adsorptive separation, membrane separation and combinations thereof; and (e) recovering a refined as a product of the process.

8. The process of claim 7 wherein the elevated pressure gas stream is air.

9. The process of claim 8 wherein a portion of the elevated pressure air is used as feed to air separation process to produce oxygen-enriched gas for the glassmaking furnace.

10. The process of claim 1 wherein the oxygen-enriched gas is commercially pure oxygen.

11. The process of claim 1 wherein the oxygen-enriched gas is at least 93% oxygen.

12. The process of claim 1 wherein the quenching is conducted down to a temperature of about 1300° F.

* * * * *

UNITED STATES PATENT AND TRADEMARK OFFICE
CERTIFICATE OF CORRECTION

PATENT NO. : 5,006,141

DATED : April 9, 1991

INVENTOR(S) : Chen et al

It is certified that error appears in the above-identified patent and that said Letters Patent is hereby corrected as shown below:

Please insert this first paragraph immediately following the title of the Specification:

-- The Government of the United States of America has rights in this invention pursuant to Contract No. DE-AC02-89CE40917 awarded by the U.S. Department of Energy.--

Signed and Sealed this

Twenty-second Day of September, 1992

Attest:

DOUGLAS B. COMER

*Attesting Officer*  *Acting Commissioner of Patents and Trademarks*